US008238258B2

(12) United States Patent
Manthoulis

(10) Patent No.: US 8,238,258 B2
(45) Date of Patent: Aug. 7, 2012

(54) SYSTEM AND METHOD OF MANAGING NETWORK PERFORMANCE

(75) Inventor: Orestis Manthoulis, Sausalito, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 818 days.

(21) Appl. No.: 11/636,400

(22) Filed: Dec. 8, 2006

(65) Prior Publication Data
US 2008/0137549 A1 Jun. 12, 2008

(51) Int. Cl.
*G01R 31/08* (2006.01)
(52) U.S. Cl. .................. 370/252; 370/235; 709/223
(58) Field of Classification Search .............. 370/252, 370/235; 709/223
See application file for complete search history.

(56) References Cited

U.S. PATENT DOCUMENTS

| | | | |
|---|---|---|---|
| 6,285,660 B1 | 9/2001 | Ronen | |
| 7,039,015 B1 | 5/2006 | Vallone et al. | |
| 7,143,152 B1 * | 11/2006 | Elman et al. | 709/223 |
| 7,221,912 B2 * | 5/2007 | Nelson et al. | 455/67.11 |
| 7,472,189 B2 * | 12/2008 | Mallya et al. | 709/224 |
| 2001/0052087 A1 * | 12/2001 | Garg et al. | 714/37 |
| 2002/0155831 A1 * | 10/2002 | Fodor et al. | 455/426 |
| 2003/0225876 A1 | 12/2003 | Oliver et al. | |
| 2004/0088314 A1 * | 5/2004 | Simes | 707/102 |
| 2004/0258003 A1 * | 12/2004 | Kokot et al. | 370/254 |
| 2006/0034185 A1 | 2/2006 | Patzschke et al. | |
| 2006/0036866 A1 * | 2/2006 | Nagendra et al. | 713/181 |
| 2006/0142001 A1 * | 6/2006 | Moisan et al. | 455/428 |
| 2006/0184624 A1 * | 8/2006 | Thukral | 709/204 |
| 2006/0215833 A1 | 9/2006 | Mahoney et al. | |
| 2006/0258348 A1 * | 11/2006 | Rajala | 455/423 |
| 2007/0121619 A1 * | 5/2007 | Kimbrough et al. | 370/389 |
| 2007/0283401 A1 * | 12/2007 | Lee et al. | 725/107 |
| 2008/0066113 A1 * | 3/2008 | Skelly | 725/58 |
| 2008/0092157 A1 * | 4/2008 | Walter et al. | 725/25 |

* cited by examiner

*Primary Examiner* — Kibrom T Hailu
(74) *Attorney, Agent, or Firm* — Toler Law Group, PC

(57) ABSTRACT

Disclosed is a system and method of managing network performance. The method includes receiving input data identifying a customer. The method also includes determining a plurality of network elements related to the customer, where the customer receives video content over a private video distribution network that includes the plurality of network elements related to the customer and at least one network device not related to the customer. The method also includes receiving performance data of each of the plurality of network elements related to the customer.

25 Claims, 6 Drawing Sheets

SYSTEM AND METHOD OF MANAGING NETWORK PERFORMANCE

FIELD OF THE DISCLOSURE

The present disclosure relates generally to managing network performance.

BACKGROUND

Television viewing is a part of daily life for many people. Advances in technology allow service providers to offer a wide range of television programming. Nonetheless, the complex network structures used by some service providers can make service problems difficult to diagnose and resolve. Typically, a service technician or customer support agent must check an entire network of devices in order to determine a cause of a service problem. Hence, there is a need for an enhanced system and method of managing network performance.

DETAILED DESCRIPTION OF THE DRAWINGS

Figure 1:
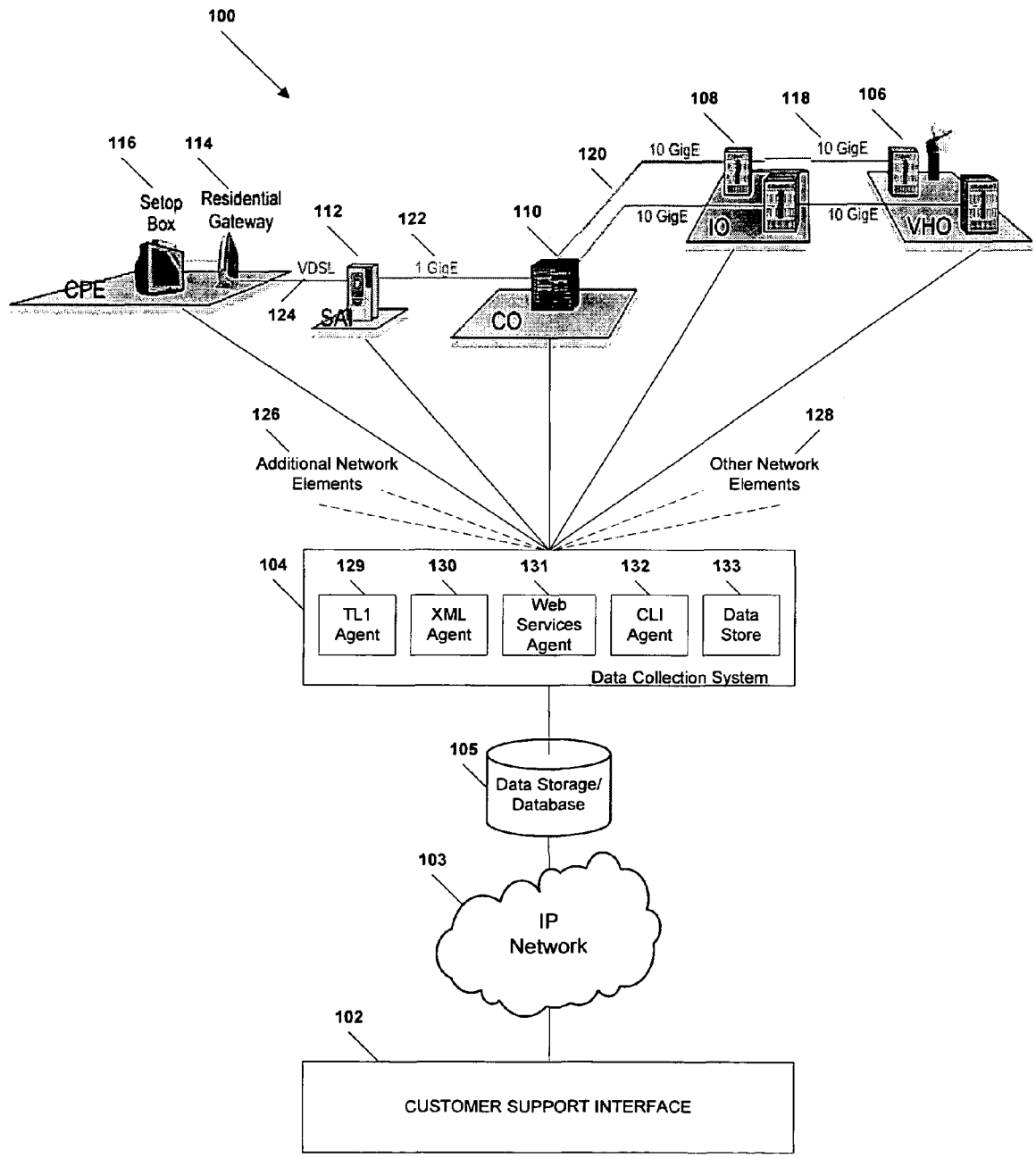
FIG. 1 is a block diagram of a particular illustrative embodiment of a system to manage network performance.

The present disclosure is generally directed to a system to manage network performance that includes a data collection system adapted to collect performance data from each of a plurality of network elements of a private video distribution network. The data collection system is also adapted to communicate with a customer support interface to receive a request for a portion of the performance data related to a subset of the plurality of network elements. A particular customer receives video content over the private video distribution network via the subset of the plurality of network elements. Further, the data collection system is adapted to send the portion of the performance data related to the subset of the plurality of network elements to the customer support interface. The subset includes less than all of the network elements of the private video distribution network. In an illustrative embodiment, the data collection system may include an element management system.

In another embodiment, the disclosure is directed to a method of managing network performance that includes receiving input data identifying a customer. The method also includes determining a plurality of network elements related to the customer, where the customer receives video content over a private video distribution network that includes the plurality of network elements related to the customer and at least one network device not related to the customer. The method also includes receiving performance data related to each of the plurality of network elements related to the customer.

In another embodiment, the disclosure is directed to a method of managing network performance that includes collecting performance data from each of a plurality of network elements of a private video distribution network. The method also includes receiving a request for a portion of the performance data related to a subset of the plurality of network elements, where a particular customer receives video content over the private video distribution network via the subset of the plurality of network elements. The method also includes sending the portion of the performance data related to the subset of the plurality of network elements to a customer support device. In an illustrative embodiment, the subset can include less than all network elements of an Internet Protocol Television (IPTV) system.

In another embodiment, the disclosure is directed to a computer-readable medium tangibly embodying instructions executable by a processor to communicate with an input device to receive input data identifying a customer. The instructions are also executable by the processor to determine a plurality of network elements related to the customer, where the customer receives video content over a private video distribution network that includes the plurality of network elements related to the customer and at least one network device not related to the customer. The instructions are also executable by the processor to request performance data related to each of the plurality of network elements related to the customer and to receive the performance data.

Referring to FIG. 1, an illustrative embodiment of a system to manage network performance is illustrated and is generally designated 100. As shown, the system 100 includes a customer support interface 102 that communicates with a data store 105 via an Internet Protocol (IP) network 103. The IP network 103 can be a private IP network, or a public Internet Protocol (IP) network, such as the Internet. In an illustrative embodiment, the customer support interface 102 can include an application, a terminal or other computing device operated by a customer support agent, or any combination thereof.

In a particular embodiment, the data store 105 can communicate with a data collection system 104, which may include an element management system. The data collection system 104 can collect performance data related to each network element of a network, such as an Internet Protocol Television (IPTV) network, a cable network, a satellite network, another private video distribution network, or another network, such as a voice network, data network, triple-play network, or quad-play network. In an exemplary embodiment, the data collection system 104 can be one of a plurality of element management systems, each of which collects performance data related to network elements in a particular geographic region, network elements of one or more particular types, network elements affecting quality of service to particular groups of users, other groupings of network elements, or any combination thereof. In another embodiment, the data collection system 104 can include, or receive the performance data from, a plurality of sub-systems that collect the performance data from the network elements 106-128.

The network can include, for example, devices at one or more video head-ends 106, such as at a national video head-end, a regional video head-end, or any combination thereof. In an illustrative embodiment, the video head-end(s) 106 can communicate with devices at a central office 110 via devices an inter-nodal office 108. Further, the central office 110 can communicate with one or more customer premises equipment devices, such as a customer residential gateway 114, a customer set-top box device 116, or any combination thereof, via a service area interface 112.

Examples of devices at a video head-end office, central office, intranodal office, or service area interface can include switch devices, host devices, such as central office terminals, access devices, aggregation devices, IP switches, IP routers, multiplexers, other devices, or any combination thereof.

In an illustrative embodiment, the video head-end 106 can communicate with the inter-nodal office 108 via at least one multiple Gigabit Ethernet (GigE) connection, such as at least one 10 GigE connection 118. Further, the inter-nodal office 108 can communicate with the central office 110 such as at least one second multiple Gigabit Ethernet connection 120. In addition, the central office 110 can communicate with the service area interface 112 via a Gigabit Ethernet connection 122. The service area interface 112 can communicate with the CPE device(s) via a digital subscriber line (XDSL) connection 124.

The data collection system 104 can collect performance data related to additional network elements 126, such as one or more video distribution hubs, one or more network edge devices, a digital subscriber line access multiplexer (DSLAM), a fiber line, a twisted pair, other network elements, or any combination thereof. Moreover, the data collection system 104 can collect performance data related to other network elements 128.

Performance data can include a variety of metrics related to the status, operation, processing speed and power, and other current or historical characteristics of a CPE device, such as a system name or other identification, an IP address, a date placed in service, a power status, a number of reboot events, a number of line errors, a number of link retrains, a number of dropped data packets, a number of errored data packets, a number of wide area network asymmetric digital subscriber line terminal unit (WAN ATU-x) errors, a number of universal serial bus (USB) cells dropped, a number of USB cells errored, a software version, a serial number, a model number, a current status, a range of uptime, a range of downtime, other metrics, or any combination thereof.

Further, performance data can include a variety of metrics related to the status, operation, processing speed and power, and other current or historical characteristics of any other network element, such as a system name or other identification, an IP address, a configuration type, a software or hardware version, a number of code violations, a number of error seconds, a number of re-initialization events, a service profile name, a line profile name, a current operating status, an ingress status, an egress status, a bandwidth percentage used, a bandwidth percentage available, a number of discarded packets, a number of errored packets, other metrics, or any combination thereof. In a particular embodiment, performance data can be collected, where applicable, regarding all the banks in a system, including all the cards in each slot of the system and each port of each card. In an illustrative embodiment, performance data can include statistics per class of service.

Performance data can be collected using a variety of protocols and methods. For example, the data collection system 104 can collect performance data from the network elements via a transaction language version one (TL1) protocol or a simple network management protocol (SNMP). In an illustrative, non-limiting embodiment, the data collection system 104 can include a TL1 agent 129, an extensible mark-up language (XML) agent 130, a web services agent 131, a command line interface (CLI) agent 132, other agents, or any combination thereof, that collect performance data from the network elements 106-128. The various agents 129-132 can include, for example, instructions executable by a processor to request the performance data from the network elements 106-128 via a TL1 request, an XML request, a CLI request, a web services request, a simple network management protocol request, via other protocols, or any combination thereof.

Performance data can be collected and stored at various time intervals, such as daily, hourly, after a certain number of minutes, such as every fifteen minutes, or any combination thereof. As a specific example, performance and statistical data may be extracted daily after one hour or fifteen minute time intervals with five minute peaks, according to a desired level of detail.

In a particular embodiment, the data collection system 104 can store the collected performance data at an internal data store 133, such as an element management system, using an XML format, comma delimited ASCII format, other data formats, or any combination thereof. In another particular embodiment, the data collection system 104 can send the performance data to the data store 105. In a particular embodiment, other applications within the network can also store data at the database 105.

In an alternative embodiment, the data store 105 can request the performance data from the data collection system 104. The data collection system 104 can send stored performance data, new performance data, or any combination thereof. In another alternative embodiment, the data store 105 can collect the performance data from the network elements 106-128.

In a particular illustrative embodiment, a customer support agent can receive a customer complaint regarding a quality of service at the customer's home. The customer support agent can input data identifying the customer via the customer support interface 102, which can be a web-enabled software application executed at a terminal or other computing device of the customer support agent. In a particular embodiment, the input data can also indicate a time range during for which performance data of network elements facilitating or otherwise affecting receipt of video content by the customer is to be returned. The time range can indicate a historical period, such as a past number of hours; a real-time period, such as a current time through a future time; or any combination thereof, such as a past hour through the next fifteen minutes or next performance data collection interval. In an illustrative, non-limiting embodiment, the input data can include a time interval that indicates how detailed performance data should be for the specified time range, such as performance data collected at each fifteen-minute interval during the previous twenty-four hour period.

The customer support interface 102 determines which network elements of the video distribution network, such as the network elements 106-124, facilitate or otherwise affect receipt of video content by the customer. The customer support interface 102 receives performance data related to the determined network elements 106-124 from the data collection system 104 via the IP network 103, and not related to other network elements, such as the other network elements 128. In an illustrative embodiment, the customer support interface 102 can request performance data related to the determined network elements 106-124 from the data store 105.

In an illustrative embodiment, the data collection system 104, data store 105, or any combination thereof, can retrieve performance data collected from the determined network elements 106-124 at a specified time interval during a specified time range, such as performance data collected at each hour during the previous twelve-hour period. The data store 105 can send the performance data to the customer support interface 102, where it can be formatted for presentation by a graphical user interface (GUI) of the customer support interface 102, such as the GUI illustrated in FIG. 5. At least a portion of the performance data can be used by a technician or other customer support agent to determine a cause of the quality of service problem reported by the customer.

Figure 2:
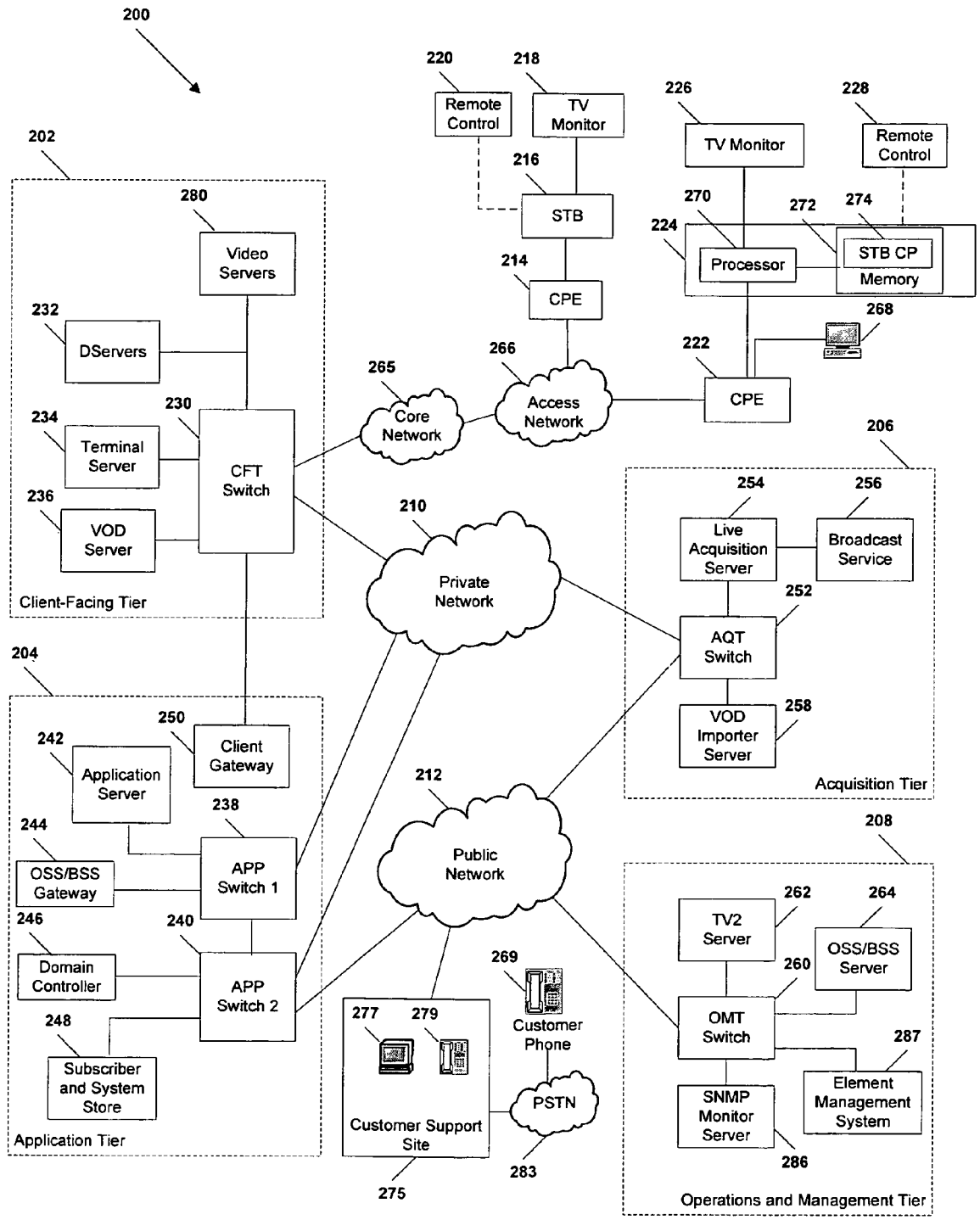
FIG. 2 is a block diagram of a second particular illustrative embodiment of a system to manage network performance.

Referring to FIG. 2, an illustrative embodiment of an Internet Protocol Television (IPTV) system is illustrated and is generally designated 200. As shown, the system 200 can include a client facing tier 202, an application tier 204, an acquisition tier 206, and an operations and management tier 208. Each tier 202, 204, 206, 208 is coupled to a private network 210; to a public network 212, such as the Internet; or to both the private network 210 and the public network 212. For example, the client-facing tier 202 can be coupled to the private network 210. Further, the application tier 204 can be coupled to the private network 210 and to the public network 212. The acquisition tier 206 can also be coupled to the private network 210 and to the public network 212. Additionally, the operations and management tier 208 can be coupled to the public network 212.

As illustrated in FIG. 2, the various tiers 202, 204, 206, 208 communicate with each other via the private network 210 and the public network 212. For instance, the client-facing tier 202 can communicate with the application tier 204 and the acquisition tier 206 via the private network 210. The application tier 204 can communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204, including, but not limited to, a client gateway 250, can communicate directly with the client-facing tier 202.

The client-facing tier 202 can communicate with user equipment via an access network 266, such as a private Internet Protocol Television (IPTV) access network. In a particular embodiment, the client-facing tier 202 can communicate with the access network 266 via a core network 265 that may include, for example, IP switches, IP routers, or any combination thereof. In an illustrative embodiment, customer premises equipment (CPE) 214, 222 can be coupled to a digital subscriber line access multiplexer, service area interface, edge device, video distribution hub, other device, or any combination thereof, of the access network 266. The client-facing tier 202 can communicate with a first representative set-top box device 216 via the first CPE 214 and with a second representative set-top box device 224 via the second CPE 222. In a particular embodiment, the first representative set-top box device 216 and the first CPE 214 can be located at a first customer premise, and the second representative set-top box device 224 and the second CPE 222 can be located at a second customer premise. In another particular embodiment, the first representative set-top box device 216 and the second representative set-top box device 224 can be located at a single customer premise, both coupled to one of the CPE 214, 222. The CPE 214, 222 can include routers, local area network elements, modems, such as digital subscriber line (DSL) modems, any other suitable devices for facilitating communication between a set-top box device and the access network 266, or any combination thereof.

In an exemplary embodiment, the client-facing tier 202 can be coupled to the CPE 214, 222 via fiber optic cables. In another exemplary embodiment, the CPE 214, 222 can be digital subscriber line (DSL) modems that are coupled to one or more network nodes via twisted pairs, and the client-facing tier 202 can be coupled to the network nodes via fiber-optic cables. Each set-top box device 216, 224 can process data received via the access network 266, via an IPTV software platform, such as Microsoft® TV IPTV Edition.

The first set-top box device 216 can be coupled to a first external display device, such as a first television monitor 218, and the second set-top box device 224 can be coupled to a second external display device, such as a second television monitor 226. Moreover, the first set-top box device 216 can communicate with a first remote control 220, and the second set-top box device 224 can communicate with a second remote control 228. The set-top box devices 216, 224 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 216, 224 can receive data, video, or any combination thereof, from the client-facing tier 202 via the access network 266 and render or display the data, video, or any combination thereof, at the display device 218, 226 to which it is coupled. In an illustrative embodiment, the set-top box devices 216, 224 can include tuners that receive and decode television programming signals or packet streams for transmission to the display devices 218, 226. Further, the set-top box devices 216, 224 can include a STB processor 270 and a STB memory device 272 that is accessible to the STB processor 270. In one embodiment, a computer program, such as the STB computer program 274, can be embedded within the STB memory device 272.

In an illustrative embodiment, the client-facing tier 202 can include a client-facing tier (CFT) switch 230 that manages communication between the client-facing tier 202 and the access network 266 and between the client-facing tier 202 and the private network 210. As illustrated, the CFT switch 230 is coupled to one or more data servers, such as D-servers 232, that store, format, encode, replicate, or otherwise manipulate or prepare video content for communication from the client-facing tier 202 to the set-top box devices 216, 224. The CFT switch 230 can also be coupled to a terminal server 234 that provides terminal devices with a connection point to the private network 210. In a particular embodiment, the CFT switch 230 can be coupled to a video-on-demand (VOD) server 236 that stores or provides VOD content imported by the IPTV system 200. Further, the CFT switch 230 is coupled to one or more video servers 280 that receive video content and transmit the content to the set-top boxes 216, 224 via the access network 266.

In an illustrative embodiment, the client-facing tier 202 can communicate with a large number of set-top boxes, such as the representative set-top boxes 216, 224 over a wide geographic area, such as a metropolitan area, a viewing area, a statewide area, a regional area, a nationwide area or any other suitable geographic area, market area, or subscriber or customer group that can be supported by networking the client-facing tier 202 to numerous set-top box devices. In a particular embodiment, the CFT switch 230, or any portion thereof, can include a multicast router or switch that communicates with multiple set-top box devices via a multicast-enabled network.

As illustrated in FIG. 2, the application tier 204 can communicate with both the private network 210 and the public network 212. The application tier 204 can include a first application tier (APP) switch 238 and a second APP switch 240. In a particular embodiment, the first APP switch 238 can be coupled to the second APP switch 240. The first APP switch 238 can be coupled to an application server 242 and to an OSS/BSS gateway 244. In a particular embodiment, the application server 242 can provide applications to the set-top box devices 216, 224 via the access network 266, which enable the set-top box devices 216, 224 to provide functions, such as interactive program guides, video gaming, display, messaging, processing of VOD material and other IPTV content, etc. In a particular embodiment, the OSS/BSS gateway 244 includes operation systems and support (OSS) data, as well as billing systems and support (BSS) data. In one embodiment, the OSS/BSS gateway 244 can provide or restrict access to an OSS/BSS server 264 that stores operations and billing systems data.

The second APP switch 240 can be coupled to a domain controller 246 that provides Internet access, for example, to users at their computers 268. For example, the domain controller 246 can provide Internet access to IPTV account information, e-mail, personalized Internet services, or other online services via the public network 212. In addition, the second APP switch 240 can be coupled to a subscriber and system store 248 that includes account information, such as account information that is associated with users who access the IPTV system 200 via the private network 210 or the public network 212. In an illustrative embodiment, the subscriber and system store 248 can store subscriber or customer data and create subscriber or customer profiles that are associated with IP addresses, stock-keeping unit (SKU) numbers, other identifiers, or any combination thereof, of corresponding set-top box devices 216, 224. In another illustrative embodiment, the subscriber and system store 248 can store data associated with capabilities of set-top box devices associated with particular customers.

In a particular embodiment, the application tier 204 can include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto. In an illustrative embodiment, the set-top box devices 216, 224 can access the IPTV system 200 via the access network 266, using information received from the client gateway 250. User devices can access the client gateway 250 via the access network 266, and the client gateway 250 can allow such devices to access the private network 210 once the devices are authenticated or verified. Similarly, the client gateway 250 can prevent unauthorized devices, such as hacker computers or stolen set-top box devices from accessing the private network 210, by denying access to these devices beyond the access network 266.

For example, when the first representative set-top box device 216 accesses the client-facing tier 202 via the access network 266, the client gateway 250 can verify subscriber information by communicating with the subscriber and system store 248 via the private network 210. Further, the client gateway 250 can verify billing information and status by communicating with the OSS/BSS gateway 244 via the private network 210. In one embodiment, the OSS/BSS gateway 244 can transmit a query via the public network 212 to the OSS/BSS server 264. After the client gateway 250 confirms subscriber and/or billing information, the client gateway 250 can allow the set-top box device 216 to access IPTV content and VOD content at the client-facing tier 202. If the client gateway 250 cannot verify subscriber information for the set-top box device 216, e.g., because it is connected to an unauthorized twisted pair, the client gateway 250 can block transmissions to and from the set-top box device 216 beyond the access network 266.

As indicated in FIG. 2, the acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives or acquires television content, movie content, advertisement content, other video content, or any combination thereof, from a broadcast service 256, such as a satellite acquisition system or satellite head-end office. In a particular embodiment, the live acquisition server 254 can transmit content to the AQT switch 252, and the AQT switch 252 can transmit the content to the CFT switch 230 via the private network 210.

In an illustrative embodiment, content can be transmitted to the D-servers 232, where it can be encoded, formatted, stored, replicated, or otherwise manipulated and prepared for communication from the video server(s) 280 to the set-top box devices 216, 224. The CFT switch 230 can receive content from the video server(s) 280 and communicate the content to the CPE 214, 222 via the access network 266. The set-top box devices 216, 224 can receive the content via the CPE 214, 222, and can transmit the content to the television monitors 218, 226. In an illustrative embodiment, video or audio portions of the content can be streamed to the set-top box devices 216, 224.

Further, the AQT switch 252 can be coupled to a video-on-demand importer server 258 that receives and stores television or movie content received at the acquisition tier 206 and communicates the stored content to the VOD server 236 at the client-facing tier 202 via the private network 210. Additionally, at the acquisition tier 206, the video-on-demand (VOD) importer server 258 can receive content from one or more VOD sources outside the IPTV system 200, such as movie studios and programmers of non-live content via satellite, via stored media, via the public network 212, or any combination thereof. The VOD importer server 258 can transmit the VOD content to the AQT switch 252, and the AQT switch 252, in turn, can communicate the material to the CFT switch 230 via the private network 210. The VOD content can be stored at one or more servers, such as the VOD server 236.

When users issue requests for VOD content via the set-top box devices 216, 224, the requests can be transmitted over the access network 266 to the VOD server 236, via the CFT switch 230. Upon receiving such requests, the VOD server 236 can retrieve the requested VOD content and transmit the content to the set-top box devices 216, 124 across the access network 266, via the CFT switch 230. The set-top box devices 216, 224 can transmit the VOD content to the television monitors 218, 226. In an illustrative embodiment, video or audio portions of VOD content can be streamed to the set-top box devices 216, 224.

FIG. 2 further illustrates that the operations and management tier 208 can include an operations and management tier (OMT) switch 260 that conducts communication between the operations and management tier 208 and the public network 212. In the embodiment illustrated by FIG. 2, the OMT switch 260 is coupled to a TV2 server 262. Additionally, the OMT switch 260 can be coupled to an OSS/BSS server 264 and to a simple network management protocol (SNMP) monitor 286 that monitors network elements within or coupled to the IPTV system 200. In a particular embodiment, the OMT switch 260 can communicate with the AQT switch 252 via the public network 212. In a particular embodiment, the OMT switch 260 can be coupled to one or more element management systems 287 that can collect performance data from network elements of the IPTV system 200.

In an illustrative embodiment, the live acquisition server 254 can transmit content to the AQT switch 252, and the AQT switch 252, in turn, can transmit the content to the OMT switch 260 via the public network 212. In this embodiment, the OMT switch 260 can transmit the content to the TV2 server 262 for display to users accessing the user interface at the TV2 server 262. For example, a user can access the TV2 server 262 using a personal computer 268 coupled to the public network 212.

In a particular embodiment, the public network 212 can be coupled to a customer support site 275 that can include a customer support agent computing device 277, as well as other devices, such as an agent telephone 279. A user phone 269 can communicate with the customer support site 275 via a public switched telephone network (PSTN) 283.

In a particular illustrative embodiment, the OSS/BSS server 264, the SNMP monitor server 286, the element management system(s) 287, or any combination thereof, can collect performance data from network elements of the IPTV system 200, such as the devices of the client-facing tier 202, the application tier 204, the acquisition tier 206, and the operations and management tier 208, devices of the access network 266, the CPE devices 214, 222, and the set-top box devices 216, 224. In an illustrative, non-limiting embodiment, the element management system(s) 287 can store the performance data collected from the network elements.

In a particular illustrative embodiment, a customer support agent at the customer support site 275 can receive a customer complaint regarding a quality of video content service at the customer's home. For example, the customer can place a call using the customer phone 269 to a customer support line that rings a customer support agent phone 279. The customer support agent can input data identifying the customer via a customer support interface at the customer support agent computing device 277. In a particular embodiment, the input data can also indicate a time range for which performance data is to be returned, as well as a time interval indicating a level of detail of the performance data.

The customer support interface determines a plurality of network elements of the video distribution network that are related to the customer. The plurality of network elements related to the customer facilitate or otherwise affect receipt of video content by the customer, such as the video server(s) 280, the CFT switch 230, the broadcast service 256, one or more devices of the access network 266, the first CPE 214, the first representative set-top box device 216, other devices of the IPTV system 200, or any combination thereof. In a particular embodiment, the customer support interface can request performance data related to the plurality of network elements related to the customer from the element management system(s) 287 via the public network 212, and not related to other network elements. The customer support interface receives the requested performance data from the element management system(s) 287.

The element management system(s) 287 can retrieve performance data collected from the plurality of network elements related to the customer. In an illustrative embodiment, the element management system 287 can retrieve performance data collected from the plurality of network elements related to the customer at a specified time interval during a specified time range, such as performance data collected at each hour during the previous twelve-hour period. The element management system(s) 287 can send the performance data to the customer support interface. A technician or other customer support agent can use at least a portion of the performance data to determine a cause of the quality of service problem reported by the customer.

In an illustrative, non-limiting embodiment, the customer support interface can receive second performance data related to at least one second plurality of network elements. For example, the customer support agent can identify one or more second customers, including one or more neighbors of the customer placing the complaint, and the customer service agent can request performance data related to network elements facilitating or otherwise affecting receipt of video content by the second customer(s), for example, at the second representative set-top box device 224. In a particular embodiment, the plurality of network elements related to the customer and the at least one second plurality of network elements related to the second customer(s) can include at least one common device, such as a service area interface device.

In an illustrative embodiment, the customer support interface or agent can compare performance data of the network elements related to the customer with performance data related to the at least one second plurality of network elements in order to determine a cause of the quality of service problem reported by the customer. For example, the customer support interface or agent can determine that the cause of the problem is a lack of available bandwidth due to traffic volume in the customer's service area or a malfunction of at least one customer premises equipment (CPE) device of the customer, a set-top box device, a residential gateway, a digital subscriber line (xDSL) communication device, or any combination thereof.

Figure 3:
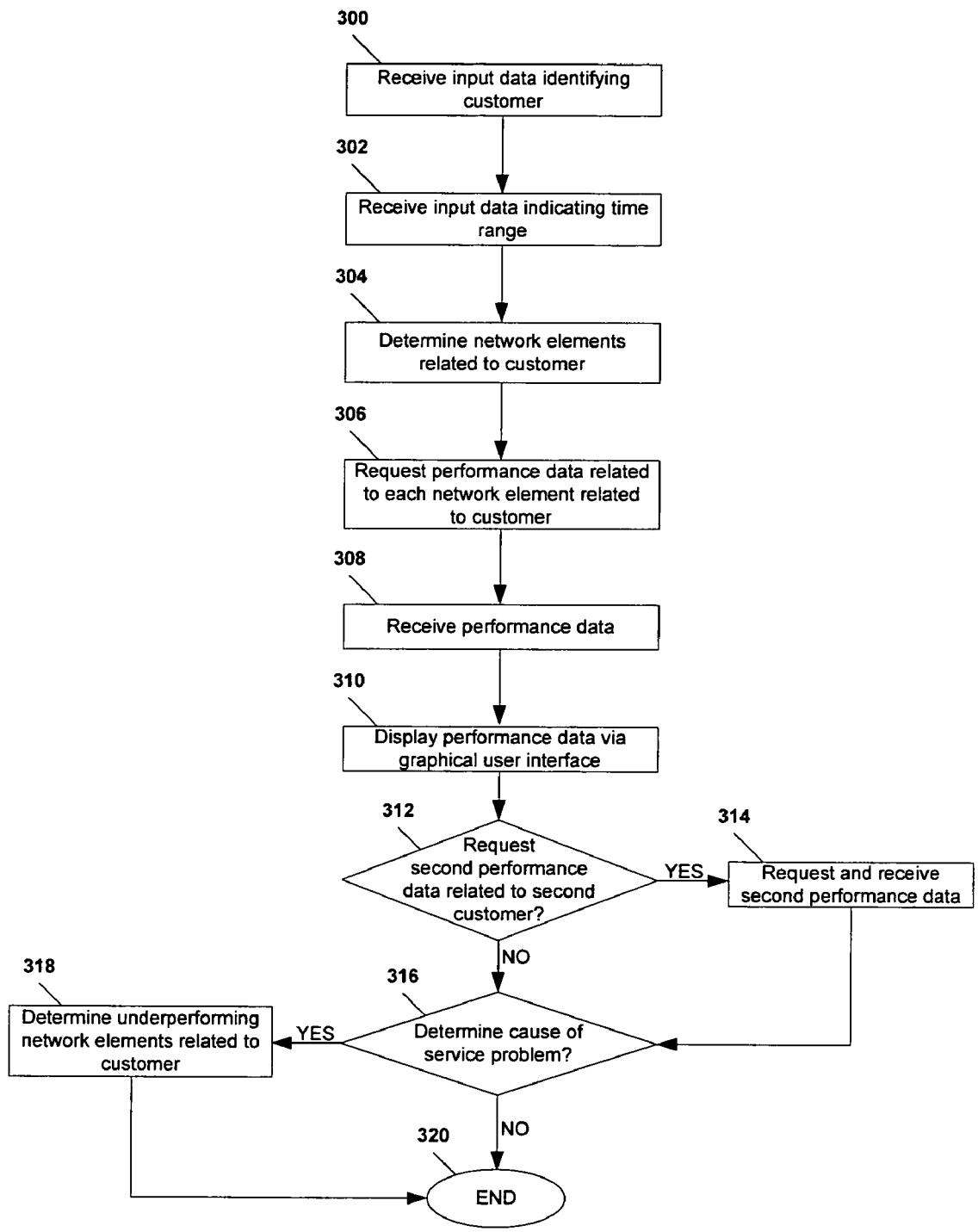
FIG. 3 is a flow diagram of a particular illustrative embodiment of a method of managing network performance.

Referring to FIG. 3, a particular illustrative embodiment of a method of managing network performance is illustrated. At block 300, a customer support interface receives input data identifying a particular customer. The customer support interface can be a computing device, a software application operated at the computing device, or any combination thereof. The customer support interface may include a graphical user interface (GUI) responsive to one or more input devices of a computing device, such as the GUI illustrated in FIG. 5. Moving to block 302, in a particular embodiment, the customer support interface can receive input data indicating a time range for which performance data of network elements is to be returned.

Proceeding to block 304, the customer support interface determines a plurality of network elements related to the customer, where the identified customer receives video content via a video distribution network that includes the plurality of network elements and one or more other network elements. Continuing to block 306, in a particular embodiment, the customer support interface requests performance data related to each of the plurality of network elements related to the customer. Advancing to block 308, the customer support interface receives the performance data. At block 310, the customer support interface displays the performance via a graphical user interface, such as that illustrated in FIG. 5. In a particular embodiment, the customer support interface can request the performance data from an element management system. In another embodiment, for example where real-time performance data is desired, the customer support interface can collect performance data from the plurality of network elements related to the customer.

Moving to decision node 312, the customer support interface determines whether it has received a command to request second performance data related to a second customer, such as a neighbor of the identified customer. If the customer support interface determines that it has not received such a command, the method proceeds to decision node 316. Conversely, if the customer support interface determines that it has received a command to request second performance data related to a second customer, the method can move to block 314, and the customer support interface requests and receives the second performance data. The method then proceeds to decision node 316.

At decision node 316, the customer support interface determines whether it has received a command to determine a cause of a service problem reported by the customer. If the customer support interface determines that it has received such a command, the method moves to block 318, and the customer support interface can determine the cause, for example, by determining one or more underperforming network elements related to the customer. The method terminates at 320.

Figure 4:
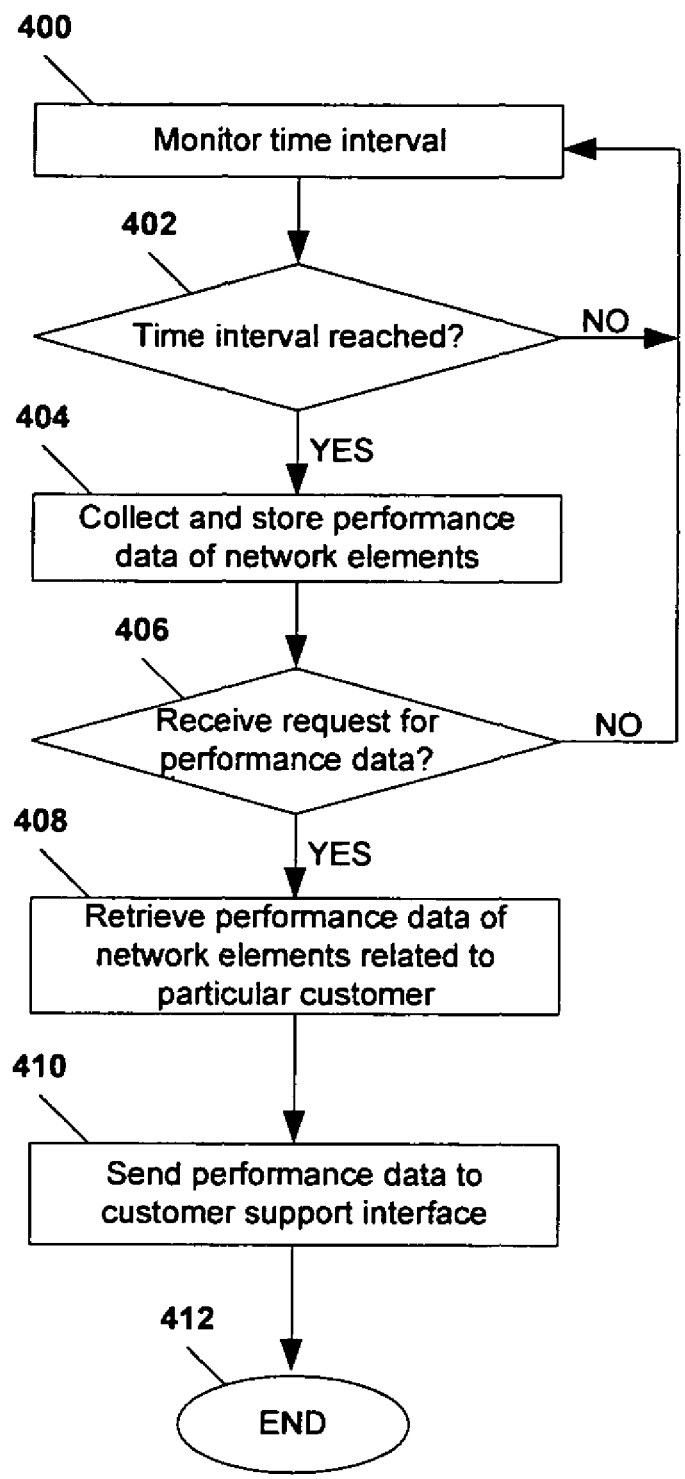
FIG. 4 is a flow diagram of a second particular illustrative embodiment of a method of managing network performance.

Referring to FIG. 4, a second particular illustrative embodiment of a method of managing network performance is illustrated. At block 400, an element management system monitors for a time interval for collecting performance data. Moving to decision node 402, the element management system determines whether the time interval has been reached. If the time interval has not been reached, the element management system continues to monitor for the time interval. On the other hand, if the time interval has been reached, the method moves to block 404, and the element management system collects and stores performance data from each network element of a network, such as a private video distribution network. In an illustrative embodiment, the element management system can store the performance data at a database coupled to or integrated with the element management system.

Proceeding to decision node 406, in a particular embodiment, the element management system determines whether it has received a request for performance data. If the element management system has not received such a request, the method returns to block 402, and the element management system monitors for the next time interval. On the other hand, if the element management system has received a request for performance data, the method moves to block 408, and the element management retrieves performance data of network elements related to a particular customer. In an illustrative embodiment, a customer support interface can determine a plurality of network elements related to a customer, such as those network elements of a video distribution network that facilitate or otherwise affect receipt of video content by the customer. The element management system can receive a request for performance data related to the plurality of network elements related to the customer from the customer support interface.

Continuing to block 410, the element management system sends the requested performance data to the customer support interface. In an illustrative embodiment, the element management system can retrieve the performance data from a database coupled to or integrated with the element management system. The method terminates at 412.

In a particular embodiment, the steps of the methods described herein can be executed in the order shown by the figures. In alternative embodiments, some steps can be executed simultaneously or in alternative sequences. For example, the element management system can continue monitoring for a time interval and collecting performance data during or after its response to a request from a customer support interface.

Figure 5:
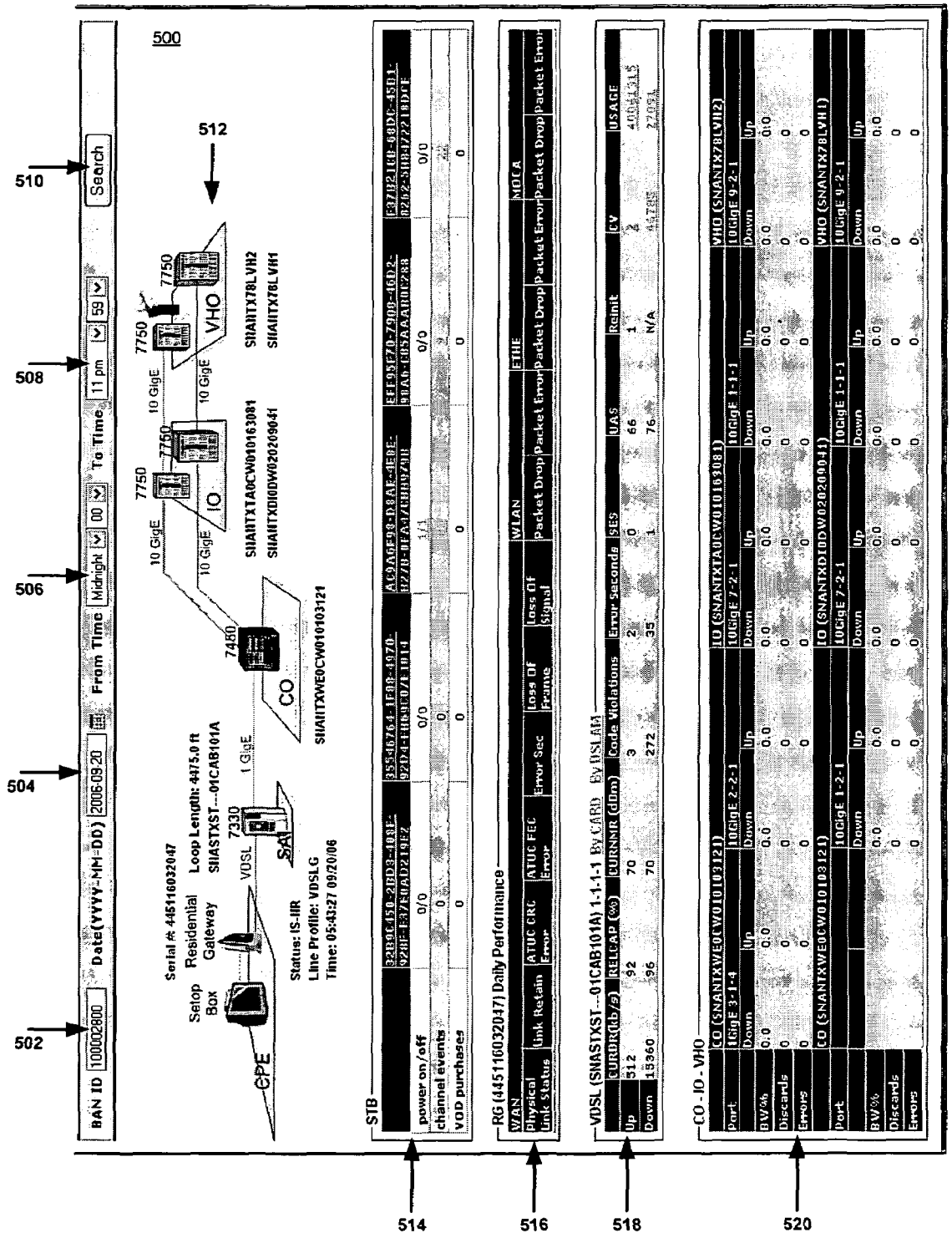
FIG. 5 is a diagram of a particular illustrative embodiment of a graphical user interface to manage network performance.

Referring to FIG. 5, a particular illustrative embodiment of a graphical user interface (GUI) to manage network performance is illustrated and designated generally 500. In the embodiment shown, the GUI 500 includes a plurality of input data fields 502-508. For example, the GUI 500 includes a customer identification field 502, such as a field to receive a bandwidth identification (BAN ID) of a customer. Further, the GUI 500 can include a date field 504 to receive a date for which performance data is to be returned via the GUI 500. In addition, the GUI 500 can include time range fields 506-508 to receive a time range for which performance data is to be returned via the GUI 500. In a specific example, the input data fields 502-508 can indicate that performance data should be returned for network elements related to customer 100002800, where the performance data was collected between midnight and 11:00 p.m., on Sep. 20, 2006. In an illustrative, non-limiting embodiment, the GUI 500 can include a selectable indicator of a command to search for network elements related to the user, for performance data related to such network elements, or any combination thereof. In one example, a selection of the search indicator can cause a customer support interface to request performance data of a plurality of network elements related to the identified customer from an element management system.

As illustrated, the GUI 500 can display an end-to-end view 512 of the plurality of network elements related to the identified customer. Further, the GUI 500 can include displays of performance data 514-520, such as first performance data 514 related to a set-top box device of the identified customer; next performance data 516 related to a residential gateway device of the identified customer; third performance data 518 related to a very-high speed digital subscriber line (VDSL) connection, VDSL card, digital subscriber line access multiplexer (DSLAM), or any combination thereof, by which the identified customer receives video content; fourth performance data 520 related to a central office from which the identified customer receives video content; or other performance data.

In conjunction with the configuration of structure described herein, the system and method disclosed provide network performance management. In a particular illustrative embodiment, a customer support interface can receive input data identifying a customer. In a particular embodiment, the input data can also indicate a time range for which performance data is to be returned. Further, the input data can include a time interval that indicates how detailed performance data should be for the specified time range, such as performance data collected at each fifteen-minute interval during the previous twenty-four hour period. The customer support interface determines a plurality of network elements of the video distribution network that are related to the customer. The customer support interface receives performance data related to the plurality of network elements related to the customer from the element management system, and not related to one or more other network elements of the video distribution network.

Figure 6:
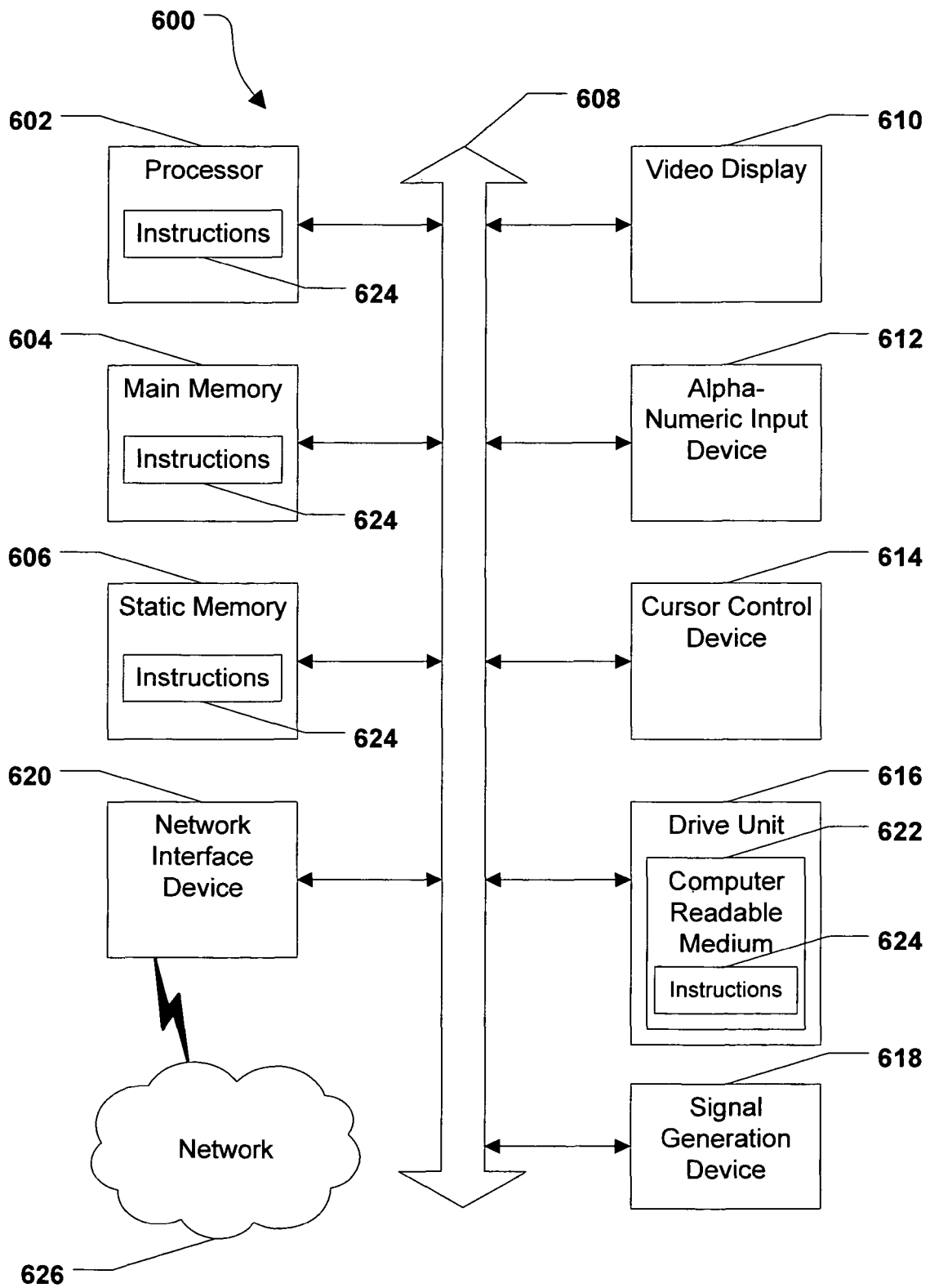
FIG. 6 is a diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices, including the network elements shown in FIGS. 1-2.

In a networked deployment, the computer system may operate in the capacity of an element management system, one or more network element devices of a video distribution network, or a customer support interface, as illustrated in FIGS. 1-2. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. Further, the computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing network performance, the method comprising:
    receiving input data from a customer support agent identifying a first customer at a computing device, wherein the first customer reported a quality of service problem with a video distribution network and wherein the input data specifies a time range;
    determining, via the computing device, a first plurality of network elements that provide end-to-end video distribution for the first customer from a head-end to a media device associated with the first customer;
    in response to receiving the input data, requesting, from a data store coupled to a data collection system, first performance data that includes corresponding network element performance data of each of the first plurality of network elements for the time range specified by the input data;
    receiving, at the computing device, the first performance data from the data store;
    determining, via the computing device, a second plurality of network elements that provide end-to-end video distribution for at least one second customer, wherein the second plurality of network elements includes at least one network element not included in the first plurality of network elements;
    receiving, at the computing device, second performance data that includes corresponding network element performance data of each network element of the second plurality of network elements;
    performing, via the computing device, a comparison of the first performance data to the second performance data; and
    automatically determining, via the computing device, a cause of the quality of service problem based on the comparison.

2. The method of claim 1, wherein the at least one second customer is a neighbor of the first customer.

3. The method of claim 1, wherein the data collection system collects performance data that is associated with the at least one network element not included in the first plurality of network elements.

4. The method of claim 3, further comprising requesting the first performance data and the second performance data from the data collection system.

5. The method of claim 1, wherein the first performance data for a particular network element includes a plurality of metrics related to a status, an operation, a processing speed, a power of the particular network element, or any combination thereof.

6. The method of claim 1, wherein at least one network device of the video distribution network is included in the first plurality of network elements and in the second plurality of network elements.

7. The method of claim 1, wherein the cause of the quality of service problem of the video distribution network is determined to be associated with a volume of traffic within a common geographic service area that includes the first customer and the second customer.

8. The method of claim 1, wherein the cause of the quality of service problem of the video distribution network is determined to be a malfunction of at least one customer premises equipment device of the first customer.

9. The method of claim 1, wherein the time range includes a future time.

10. The method of claim 1, wherein the first performance data includes historical data based at least in part on the time range.

11. The method of claim 1, wherein the input data indicates a time interval, and wherein the first performance data provides an indication of the corresponding network element performance of each of the first plurality of network elements within each of a plurality of subintervals of the time range, each subinterval having a duration of the time interval.

12. A method of managing network performance, the method comprising:

collecting, at an element management system, performance data including corresponding network element performance data of each of a plurality of network elements of a private video distribution network, the performance data including end-to-end performance data of the private video distribution network from a video head-end to a set-top box device;

receiving a request from a customer support interface to send a first portion of the performance data corresponding to a time range specified by the request and a second portion of the performance data, wherein the first portion of the performance data is associated with a first subset of the plurality of network elements that provide end-to-end video distribution for a first customer, wherein the second portion of the performance data is associated with a second subset of the plurality of network elements that provide end-to-end video distribution for a second customer, and wherein the first subset includes at least one first network element in common with the second subset and at least one second network element not included in the second subset; and sending the first portion of the performance data and the second portion of the performance data from the element management system to the customer support interface in response to the request, wherein the customer support interface determines a cause of a quality of service problem by comparing the first portion of the performance data to the second portion of the performance data when the customer support interface receives an indication of the quality of service problem associated with the video distribution network from the first customer.

13. The method of claim 12, wherein the first subset of the plurality of network elements includes less than all network elements of an internet protocol television system.

14. The method of claim 13, wherein the request is received from the customer support interface via a public internet protocol data network.

15. The method of claim 12, wherein the first subset of the plurality of network elements affect receipt of video content by the first customer.

16. A system to manage network performance, the system comprising:
a data collection system comprising a processor adapted to:
collect performance data including corresponding network element performance data of each of a plurality of network elements of a private video distribution network, the performance data including end-to-end performance data of the private video distribution network from a video head-end to a set-top box device;
communicate with a customer support interface to receive a request to send a first portion of the performance data corresponding to a time range specified by the request and a second portion of the performance data, wherein the first portion of the performance data is associated with a first subset of the plurality of network elements that provide end-to-end video distribution for a first customer, and wherein the second portion of the performance data is associated with a second subset of the plurality of network elements that provide end-to-end video distribution for a second customer, and wherein the first subset includes at least one first network element in common with the second subset and at least one second network element not included in the second subset; and
send the first portion of the performance data and the second portion of the performance data to the customer support interface in response to the request, wherein the customer support interface determines a cause of a quality of service problem based on a comparison of the first portion of the performance data to the second portion of the performance data when the customer support interface receives an indication of the quality of service problem associated with the private video distribution network from the first customer.

17. The system of claim 16, wherein the first subset of the plurality of network elements includes at least one customer premises equipment device.

18. The system of claim 16, wherein the first portion of the performance data includes a power status, a number of reboot events, a number of line errors, a number of link retrains, a number of wide area network asymmetric digital subscriber line terminal unit errors, a number of universal serial bus cells dropped, a number of universal serial bus cells errored, a serial number, a model number, a current status, a range of uptime, a range of downtime, or any combination thereof.

19. The system of claim 17, wherein the first subset of the plurality of network elements includes a regional video head-end device, a video distribution hub device, an inter-nodal network device, a central office device, a Gigabit Ethernet connection, a multi-Gigabit Ethernet connection, a service area interface device, a twisted pair, or any combination thereof.

20. The system of claim 16, wherein the first portion of the performance data includes an identification, a hardware version, a number of code violations, a number of error seconds, a number of re-initialization events, a service profile name, a line profile name, a current operating status, an ingress status, an egress status, a bandwidth percentage available, a number of errored packets, or any combination thereof.

21. The system of claim 16, further comprising an element management system to store the performance data, wherein the data collection system is adapted to retrieve the first portion of the performance data and the second portion of the performance data from the element management system in response to the request.

22. A non-transitory computer-readable medium embodying a set of instructions that are executable by a processor to:
communicate with an input device to receive input data identifying a first customer, wherein the first customer reported a quality of service problem with a video distribution network and wherein the input data specifies a time range;
determine a first plurality of network elements of the video distribution network that provide end-to-end video distribution for the first customer from a head-end to a media device associated with the first customer;
in response to receiving the input data, request, from a data store coupled to a data collection system, first performance data that includes corresponding network element performance data associated with each of the first plurality of network elements for the time range specified by the input data;
determine a second plurality of network elements that provide end-to-end video distribution for at least one second customer, wherein the second plurality of network elements includes at least one network element not included in the first plurality of network elements;
request, from the data store, second performance data that includes corresponding network element performance data associated with each of the second plurality of network elements;

receive the first performance data and the second performance data from the data store; and compare the first performance data to the second performance data to determine a cause of the quality of service problem.

23. The non-transitory computer-readable medium of claim 22, wherein the first plurality of network elements includes a set-top box device associated with the first customer.

24. The non-transitory computer-readable medium of claim 22, further comprising instructions executable by the processor to generate an interactive graphical user interface responsive to the input device, wherein the interactive graphical user interface includes one of a customer identification field, a time range field, a time interval field, a selectable indicator to determine the network elements that are included in the first plurality of network elements associated with the first customer, the performance data, and an image of the first plurality of network elements associated with the first customer.

25. The non-transitory computer-readable medium of claim 22, wherein the second customer is a neighbor of the first customer.

* * * * *